United States Patent
Iao

(10) Patent No.: US 9,292,093 B2
(45) Date of Patent: Mar. 22, 2016

(54) INTERFACE METHOD AND APPARATUS FOR INPUTTING INFORMATION WITH AIR FINGER GESTURE

(75) Inventor: Mike Iao, Anaheim, CA (US)

(73) Assignee: Alpine Electronics, Inc., Tokyo (JP)

( * ) Notice: Subject to any disclaimer, the term of this patent is extended or adjusted under 35 U.S.C. 154(b) by 47 days.

(21) Appl. No.: 13/299,958

(22) Filed: Nov. 18, 2011
(Under 37 CFR 1.47)

(65) Prior Publication Data

US 2013/0076615 A1    Mar. 28, 2013

Related U.S. Application Data

(60) Provisional application No. 61/415,292, filed on Nov. 18, 2010.

(51) Int. Cl.
| | |
|---|---|
| *G06F 3/01* | (2006.01) |
| *G06F 3/0488* | (2013.01) |
| *B60K 35/00* | (2006.01) |
| *B60K 37/06* | (2006.01) |
| *G01C 21/36* | (2006.01) |

(52) U.S. Cl.
CPC ............... *G06F 3/017* (2013.01); *B60K 35/00* (2013.01); *B60K 37/06* (2013.01); *G01C 21/365* (2013.01); *G01C 21/3605* (2013.01); *G01C 21/3623* (2013.01); *G01C 21/3664* (2013.01); *B60K 2350/1052* (2013.01); *B60K 2350/2052* (2013.01); *B60K 2350/928* (2013.01)

(58) Field of Classification Search
CPC .. G06F 3/017; G01C 21/365; G01C 21/3605; G01C 21/3664; G01C 21/3623; B60K 35/00; B60K 37/06; B60K 2350/928; B60K 2350/1052; B60K 2350/2052
USPC ............ 345/156; 701/400, 426, 438; 715/863
See application file for complete search history.

(56) References Cited

U.S. PATENT DOCUMENTS

| | | | |
|---|---|---|---|
| 4,973,139 A | 11/1990 | Weinhrauch et al. | |
| 7,782,299 B2 | 8/2010 | Ogino | |
| 2005/0248529 A1 | 11/2005 | Endoh | |
| 2006/0208169 A1* | 9/2006 | Breed ................... | B60N 2/002 250/221 |
| 2007/0057781 A1* | 3/2007 | Breed ................... | B60K 35/00 340/457.1 |
| 2008/0059428 A1* | 3/2008 | Kinder ............... | 707/3 |
| 2008/0154488 A1* | 6/2008 | Silva ................ | G01C 21/36 701/426 |
| 2011/0050589 A1* | 3/2011 | Yan ................ | B60K 37/06 345/173 |

FOREIGN PATENT DOCUMENTS

| | | |
|---|---|---|
| JP | 2003-308167 | 10/2003 |
| JP | 2007-133835 | 5/2007 |

\* cited by examiner

*Primary Examiner* — Lun-Yi Lao
*Assistant Examiner* — Ibrahim Khan
(74) *Attorney, Agent, or Firm* — Muramatsu & Associates

(57) ABSTRACT

An interface apparatus and method is disclosed for inputting information with a user's finger gesture while the user is driving with his two hands on a steering wheel. In one aspect, the interface apparatus includes a gesture sensor, a gesture processor, and a head-up display (HUD), where the gesture sensor and the gesture processor recognizes and interpret the information input by the user's finger gesture and such information is displayed on the HUD. In one embodiment, a plurality of point of interest (POI) icons are displayed on the HUD after the user inputs at least one letter into the system and the user can select the POI by his/her finger gesture. In another embodiment, the gesture sensor can recognize the user's finger gesture in non-alphabet characters.

18 Claims, 14 Drawing Sheets

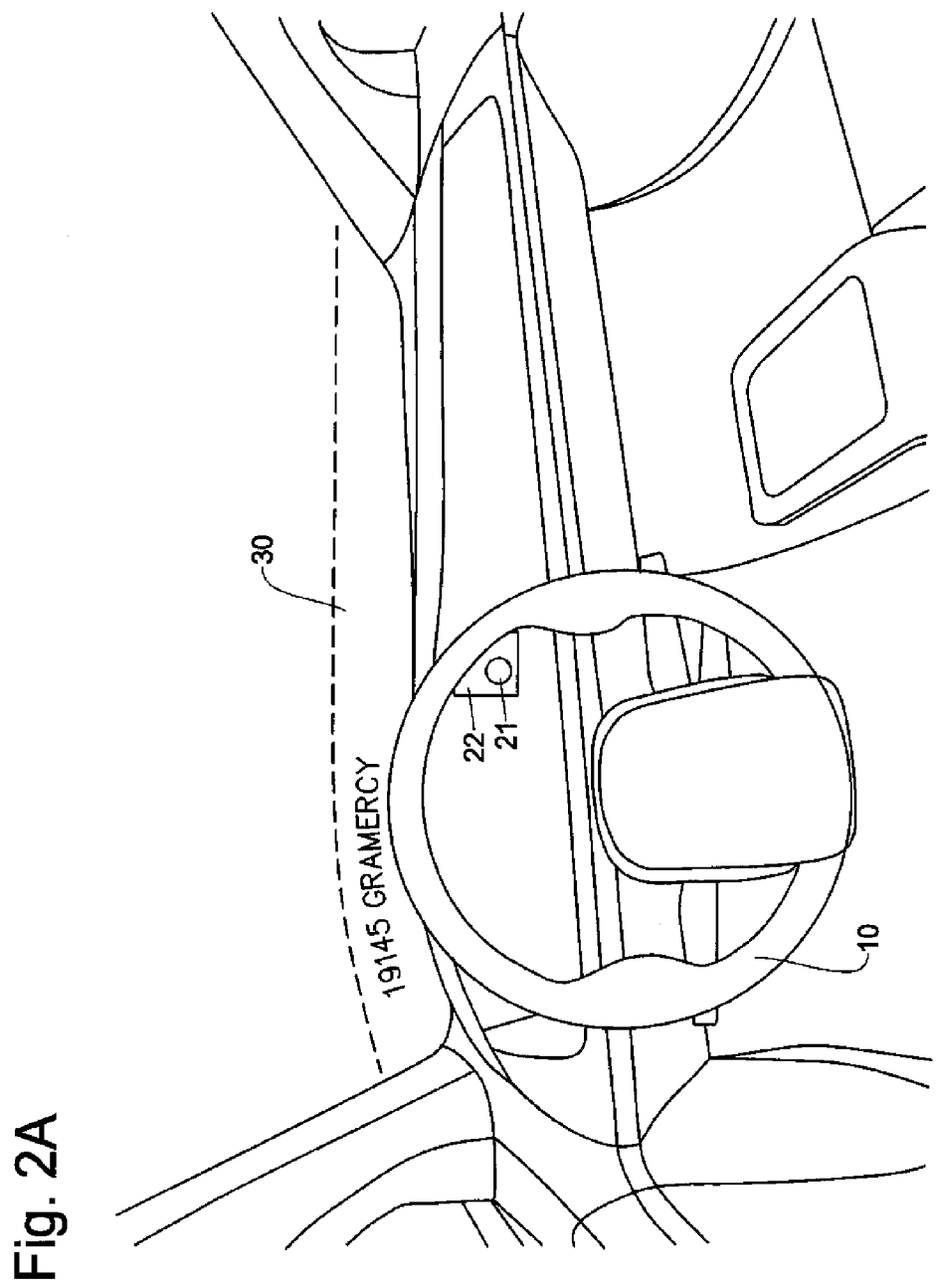

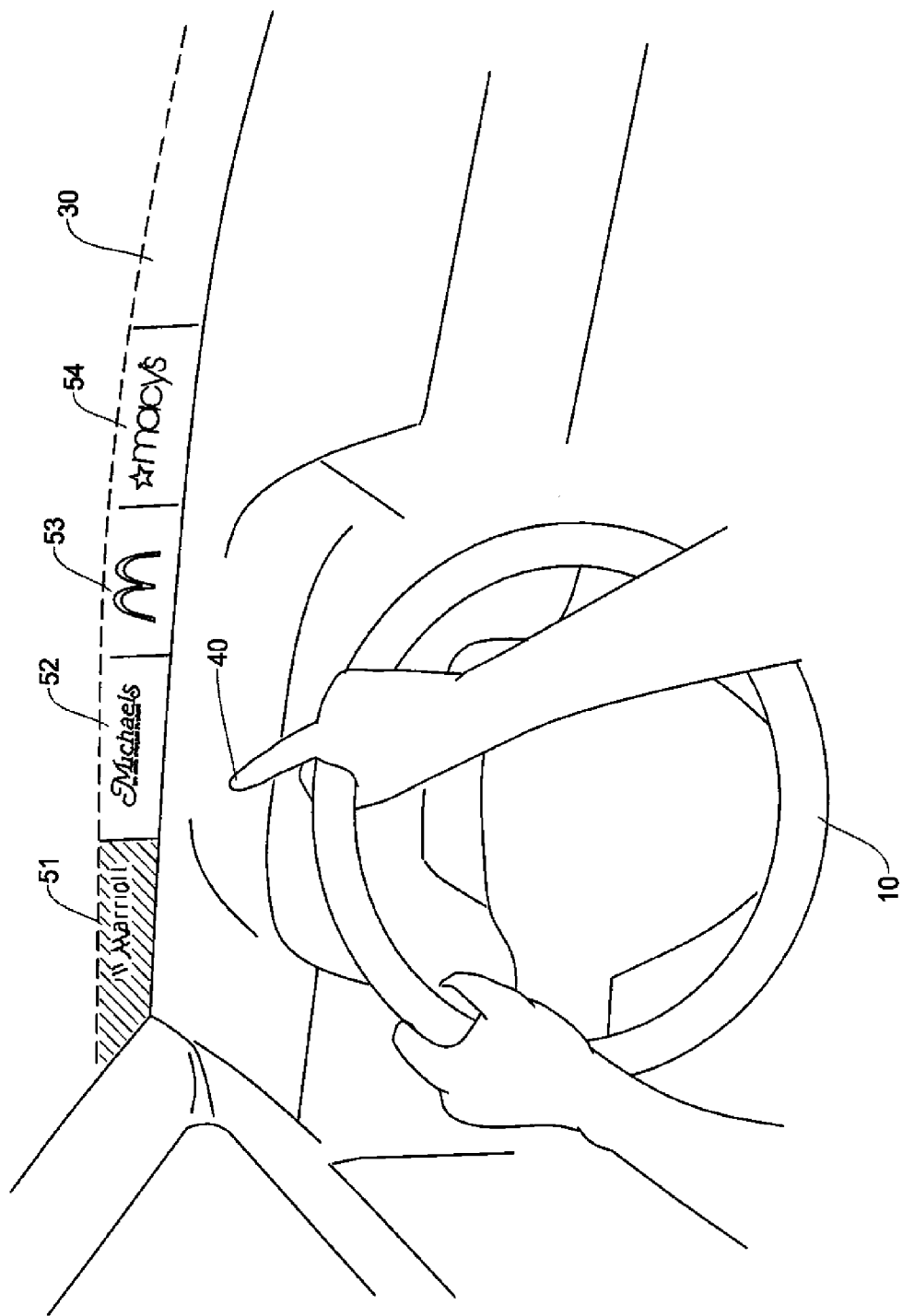

INTERFACE METHOD AND APPARATUS FOR INPUTTING INFORMATION WITH AIR FINGER GESTURE

CROSS-REFERENCE TO RELATED APPLICATIONS

This application claims the benefit of U.S. Provisional Patent Application Ser. No. 61/415,292 filed Nov. 18, 2010, the disclosure of which is incorporated herein by reference in its entirety.

FIELD

Embodiments disclosed here relate to an interface method and apparatus for inputting information for electronics devices. More specifically, the embodiments relate to an interface method and apparatus for inputting information for a navigation system, automobile entertainment system, etc. through a user's finger gesture while the user is driving a vehicle.

BACKGROUND

With remarkable advances in computer technologies, automobile electronics devices such as a navigation system have become more popular and affordable recently for most users. The navigation system provides primary functions to determine a user's current position by utilizing signals from Global Positioning System (GPS), to provide optimum routing information between a vehicle's current position and a destination, and to perform a guidance operation to the destination. In order to perform the above-mentioned functions, the navigation system is usually equipped with a sophisticated navigation functionality implemented by navigation computer programs and one or more detailed database to store and provide maps, road networks, geographical features, and waypoint or point-of-interest (POI) information.

FIG. 1 shows display examples involved in a navigation system that describe steps of inputting an address of a desired destination, etc. In FIG. 1, a display example 2 shows a main menu screen through which a user selects a "destination" menu, and a display example 4 shows a list of methods for specifying the destination. Among the methods in the list, the user has selected an "address" method as highlighted in the display example 4. As a result of selecting the "address", the navigation system displays an image of keyboard as shown in a display example 6 which prompts the user to input a street name, street number, etc. via the keyboard.

The interface between the user and the navigation system has been gradually transformed from a text-based communication as shown in FIG. 1 to a graphic-based communication which allows the user to intuitively operate the navigation system. However, in either of the communications, when the navigation system is installed in a vehicle, at least one hand of a driver (hereafter interchangeably referred to as "a user") may have to be taken off the steering wheel and the user's eyes may have to be taken off the road on which the vehicle is running. Consequently, the interface inevitably increases the level of driver distraction and a chance of accident.

Not only the navigation system, a modern vehicle may also include other electronics systems such as an automobile entertainment system, a head unit, etc. The user may select a music title, an artist name, etc. for the automobile entertainment system in the manner similar to that of the navigation system noted above, which also increases the user's distraction from the driving. Therefore, there remains a need for a new and improved interface method and apparatus for the user to input information for a navigation system or other electronics system based on user's finger gesture when the user is driving a vehicle with two hands on the steering wheel.

SUMMARY

It is, therefore, an object of the present application to provide an interface method and apparatus for inputting information for an electronics system installed in a vehicle while the user is driving the vehicle without causing significant driver distraction.

It is another object of the present application to provide an interface method and apparatus for inputting information in a vehicle navigation system, etc. via the user's finger gesture while the user is driving with his/her two hands on the steering wheel.

It is a further object of the present application to provide an interface method and apparatus for interfacing between a driver and an electronics system such as a navigation system by detecting and recognizing the driver's finger gesture, and converting the finger gesture into meaningful characters.

It is still a further object of the present application to provide an inputting method and apparatus which allows the user to input information in different languages based on the user's finger movements reflecting the characters of such languages.

According to one aspect of the embodiments, a method for inputting information may include the steps of detecting movement of an object in a three dimensional space, recognizing and interpreting the movement of the object, and determining a meaning of the movement of the object and displaying the meaning on a display unit.

In one embodiment, the object is a finger of the driver behind the steering wheel. Preferably, the three dimensional space may be located between the steering wheel and a dashboard close to the driver. In another embodiment, the step of recognizing and interpreting the movement of the object may include capturing the movement of the object with a camera or a gesture sensor on the dashboard. In a further embodiment, the step of determining a meaning of the movement of the object and displaying the meaning on a display unit may include the step of displaying a plurality of brand name icons on the display unit for the driver to select when the driver's finger gesture is recognized.

BRIEF DESCRIPTION OF THE DRAWINGS

FIGS. 2A and 2B show examples of a vehicle interior implementing an embodiment of the interface method and apparatus for inputting information in a navigation system with a driver's (user's) finger gesture while the driver's two hands are on the steering wheel.

FIGS. 3A to 3D further show examples of a vehicle interior implementing an embodiment of the interface method and apparatus for inputting information in a navigation system with the driver's finger gesture while the driver's two hands are on the steering wheel, where the user's finger gesture represents a particular letter.

DETAILED DESCRIPTION OF THE PREFERRED EMBODIMENTS

Figure 1:
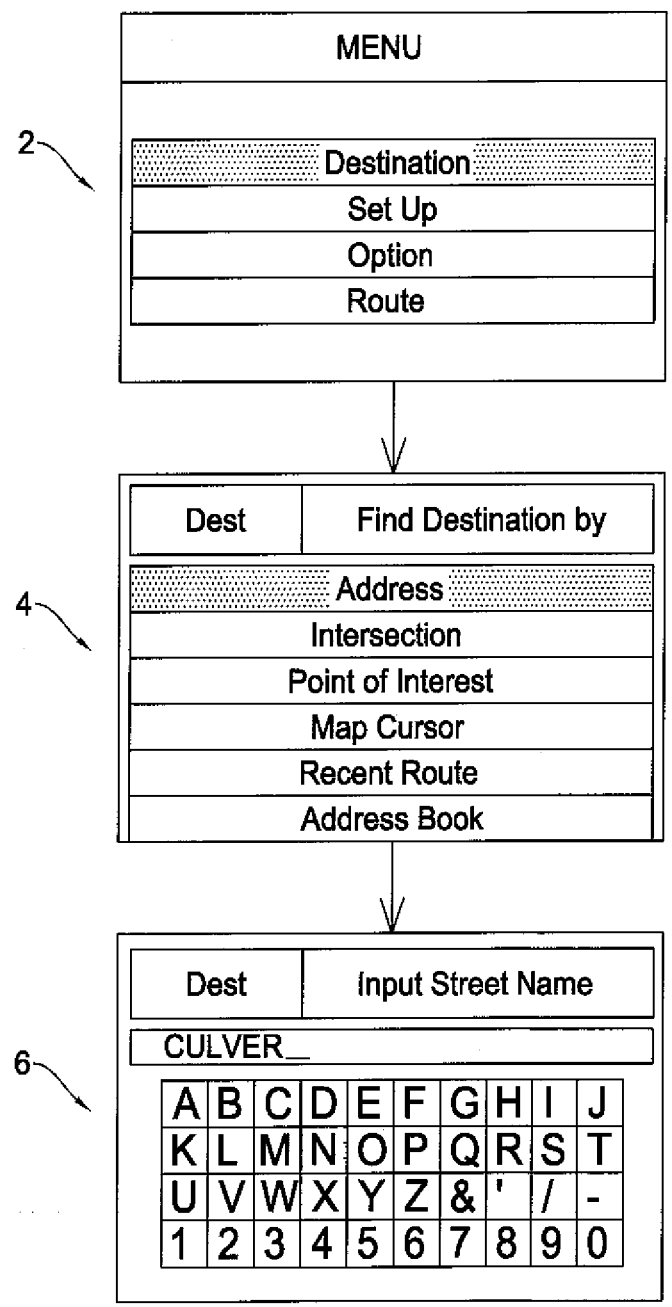
FIG. 1 shows display examples illustrating a conventional interface method for inputting information for a navigation system through a touch-screen keyboard displayed on a navigation screen.

The detailed description set forth below is intended as a description of the device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the methods, devices and materials are now described.

All publications mentioned are incorporated by reference for the purpose of describing and disclosing, for example, the designs and methodologies that are described in the publications which might be used in connection with the presently described invention. The publications listed or discussed above, below and throughout the text are provided solely for their disclosure prior to the filing date of the present application. Nothing herein is to be construed as an admission that the inventor is not entitled to antedate such disclosure by virtue of prior invention.

The embodiments disclosed here relate to an apparatus and method for inputting information in an electronics device or system installed in a vehicle. More specifically, the embodiments relate to an interface method and apparatus to input information in a navigation system, etc. based on a user's pointer gesture while the user is driving the vehicle using the steering wheel. Further, the embodiments relate to an interface method and apparatus to input information based on user's pointer movements by incorporating a head-up display that displays the resultant information on a vehicle windshield.

As stated above, the driver distraction has become an important issue since more and more drivers tend to take either their eyes off the road or their hands off the steering wheel to do something else while driving. Statistically, the driver distraction has become the leading cause of most vehicle crashes and near-crashes in recent years. Therefore, there is a need of an interface method and system for interfacing between the driver and an electronics device, such as a navigation system, to effectively input information while driving without causing too much distraction from the driving.

The interface method and apparatus for inputting information via an air pointer gesture in the present embodiment is mainly described for a case where the interface apparatus is incorporated in a vehicle navigation system. However, the interface method and apparatus disclosed here is also applicable to other electronics devices such as an automobile audio/video head unit, an automobile entertainment system, etc. The vehicle may include not only an automobile but also a motorcycle, a ship, or any other mobile vehicle having a head-up display which is typically established on a windshield of the vehicle to show the resultant information.

As can be seen in FIG. 2A that shows an example of vehicle interior, an interface apparatus or system for inputting and displaying information based on pointer gestures includes a gesture sensor 22, and a head-up display (HUD) 30 on the windshield.

Here, within the context of the present application, a pointer can be a finger, hand or any body part of a user or a pen, pencil, etc. operated by the user. In other words, the pointer can be any object that the gesture sensor 22 can detect once it is presented to the gesture sensor and thus, the gesture sensor 22 is able to recognize the object as a pointer. In the description of the present application, a pointer and a finger are interchangeably used, however, as noted above, the pointer is not limited to the finger. Via the interface apparatus, the user can input the information by moving a pointer such as a finger while keeping two hands on the steering wheel 10.

A structural and software example of the gesture sensor that can be implemented in the embodiment of the present application is disclosed, for example, in U.S. Patent Application Publication No. 2005/0248529, which is hereby incorporated by reference in its entirety. The dotted line on the windshield indicates an area of the head-up display (HUD) 30 that displays the information specified by the finger gesture. An example of structure of a head-up display (HUD) system that can be implemented in the embodiment described in the present application is disclosed in U.S. Pat. No. 4,973,139, which is hereby incorporated by reference in its entirety.

Figure 2B:
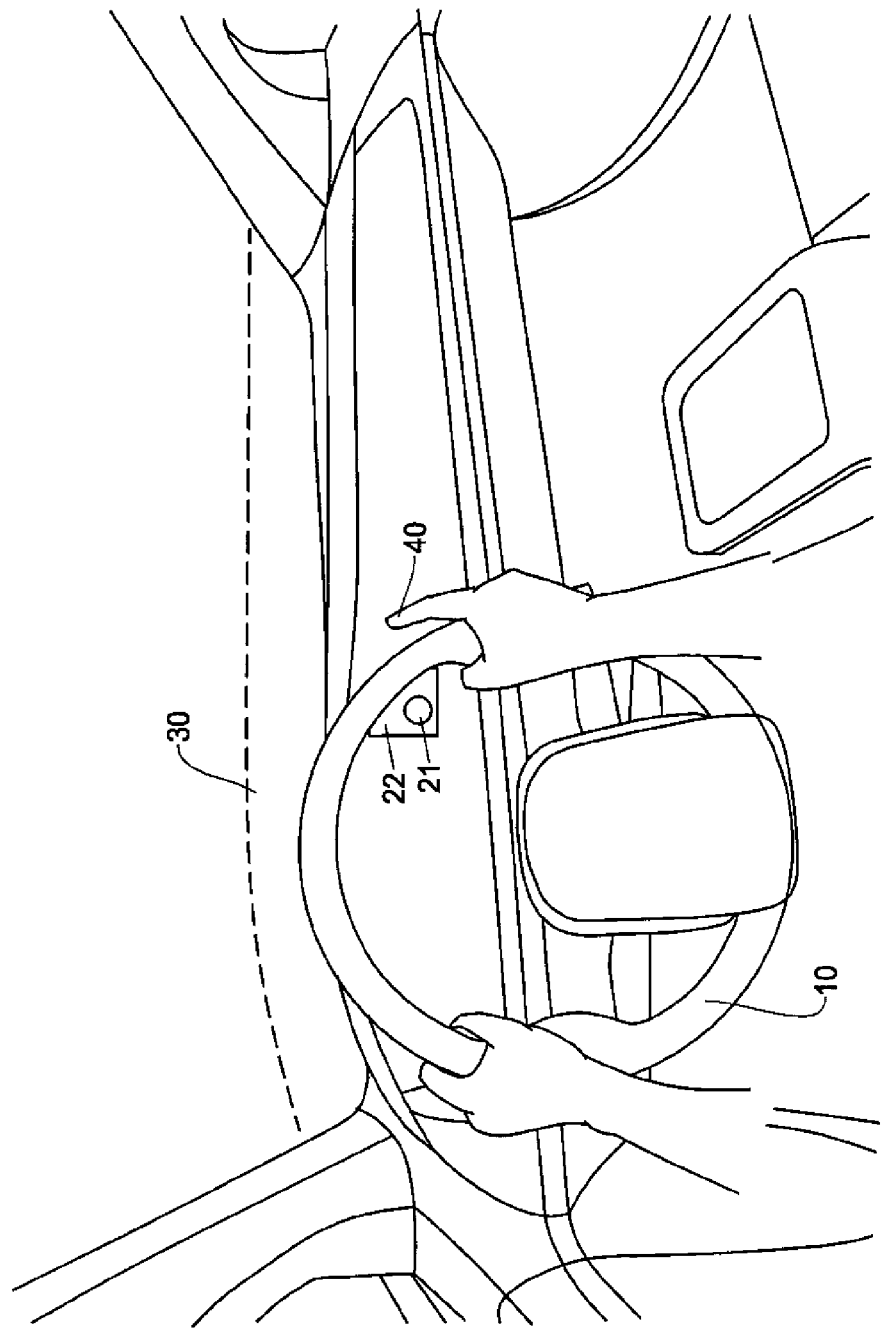

FIG. 2B is similar to that of FIG. 2A except that it further shows a user's hands on the steering wheel and a finger 40, typically, a right hand index finger. In one embodiment, the gesture sensor 22 includes a video camera 21 therein to detect the movements of the user's finger 40. The gesture sensor 22 is communicatively coupled with a gesture processor (ex. gesture processor 127 shown in FIG. 8) to recognize and interpret the user's finger gesture. A character and a number input by the finger movement of the user can be shown on the head-up display 30.

For example, the user can input an address such as "19145 Gramercy" as shown in FIG. 2A while two hands remaining on the steering wheel 10. The user can simply draw or write with his/her index finger 40 an intended character or number in the air to input the address in a stroke-by-stroke or letter-by-letter manner. Then, the gesture sensor 22 detects the user's finger movements and the gesture processor (not shown in FIG. 2A but shown in FIG. 8) recognizes one or more characters and/or numbers indicated by the user's air finger gesture. The user's input information can then be displayed on the head-up display 30 which is typically established on the windshield of the vehicle. The user can also use the finger gesture to delete or cancel the information which might be mistakenly input by, for example, pointing the finger to a delete or cancel menu (not shown).

As shown in FIGS. 3A-3D, the interface apparatus of the navigation system accepts user's finger gesture indicating a character (letter) and produces, for example, matching entries that reflect the user's finger gesture. In the display example of FIG. 3A, the head-up display (HUD) 30 produces a plurality of icons 51-54 that match one or more letters specified by the finger gesture of the user. For example, when the user's finger gesture represents a letter "M", the gesture sensor 22 captures and detects the user's finger gesture, and the gesture processor recognizes the user's finger gesture as a letter "M".

Accordingly, the gesture processor causes to produce a number of POI entries 51-54 starting with the letter "M" such as "Marriott", "Michaels", "McDonald's", and "Macy's" on the HUD 30. Inputting at least one letter into the navigation system returns one or more candidate POIs that start with the input letter and the user can select the POI among the plurality of candidate POIs without inputting the full name of the POI. Since the user does not have to input a full name of the point of interest (POI), not only does the interface apparatus save the user's time, but also significantly reduce the driver distraction.

Similarly, the user's finger gesture indicating a letter "B" will display POI entries starting with the letter "B", such as "Baja Fresh", "Bennigan's" and "Black Angus Steakhouse", etc., on the HUD 30. From the candidate POI entries on the HUD 30, the user can select a desired POI by a user's finger gesture. Moreover, the interface apparatus of the navigation system allows the user to set a category of POI, such as a restaurant or a hotel category, by a user's finger gesture.

Figure 3A:
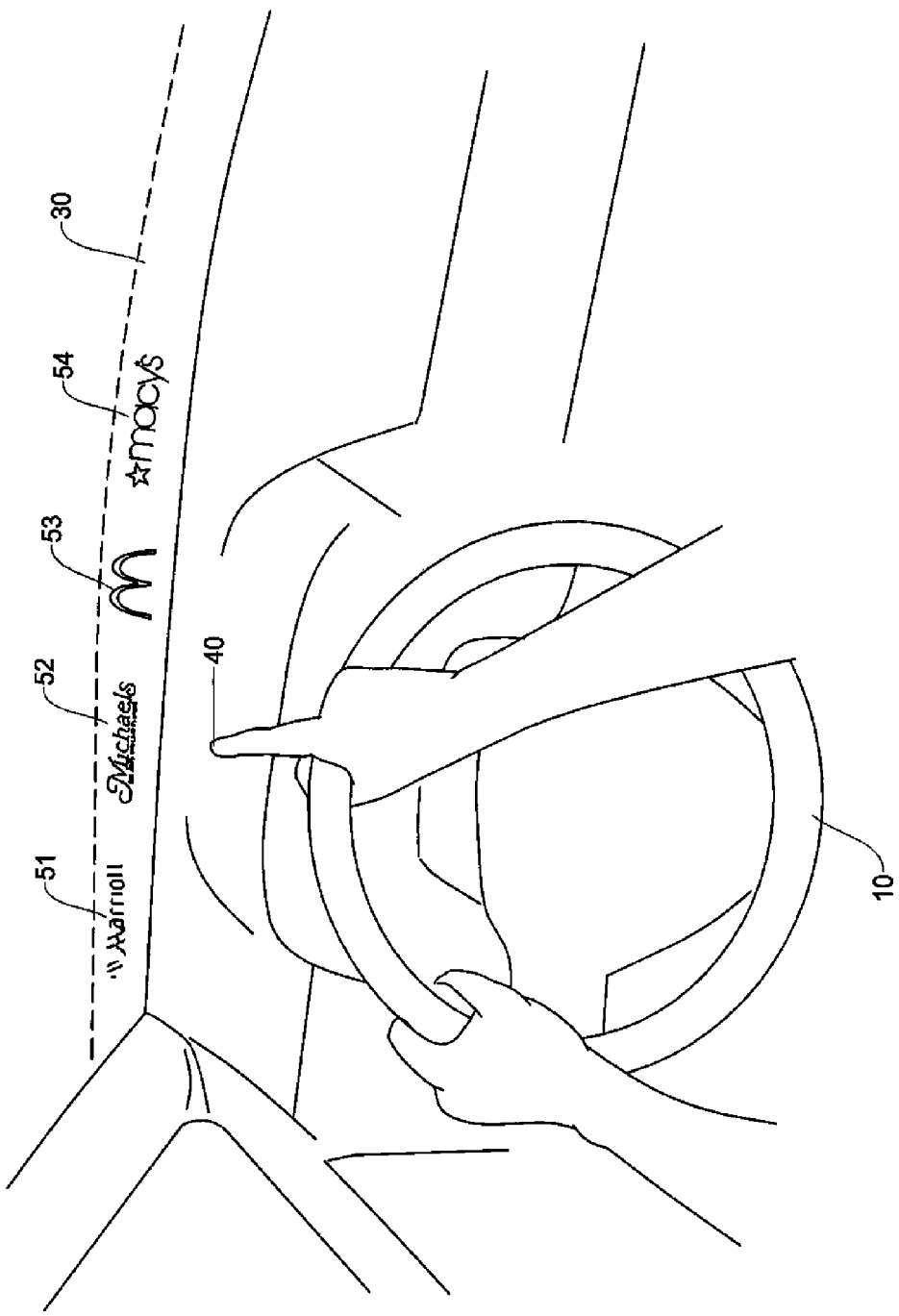
Figure 3B:
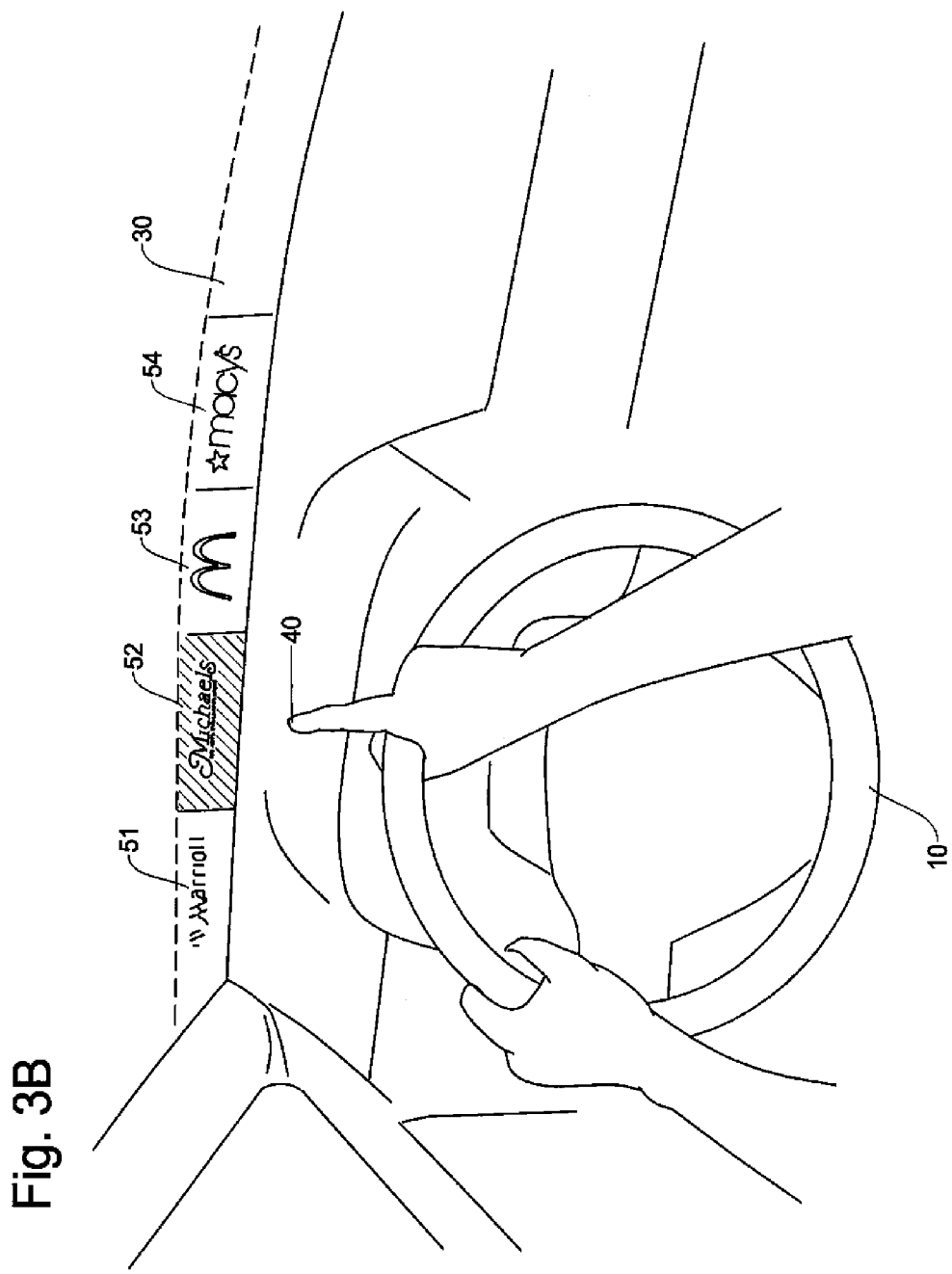

As can be seen from FIGS. 3B and 3C, when there are a number of POI candidates shown on the HUD 30, the user can use his/her finger gesture to select a desired POI icon. In FIG. 3B, by pointing to the POI entry 52 "Michaels" with the finger 40, the user can select the desired POI name "Michaels" which may be high-lighted on the HUD 30 (shown by dot hatch). Similarly, by pointing to the POI entry 51 "Marriott" with the finger 40, the user is able to select the name "Marriott", which may be high-lighted on the HUD 30, as shown in FIG. 3C.

In such a selection process, the gesture processor (FIG. 8) interprets the user's finger direction and determines which entry is selected. The HUD 30 preferably indicates which entry is selected by the user's finger gesture in real time such as shown in FIGS. 3B and 3C by high-lighting the selected entry as noted above, thereby providing feedback to the user. The user may confirm the selection by issuing still another finger gesture by pointing an "OK" menu (not shown). Alternatively, the user may press a button (see FIGS. 6 and 8) on or close to the steering wheel 10 or produce a voice command to confirm the selection.

The selected POI entry may be used to specify a destination for a route calculation operation and a route guidance operation by the navigation system. Moreover, in the case of other electronics system in the vehicle, such as an automobile entertainment system, the input method described above can be used to find an artist name, song title, etc., to select music files. The finger gesture is not limited to alphabet or numeric characters but may include other characters as well. For example, Chinese, Japanese, Arabic or any other characters may also be used in the similar manner described above.

Figure 3D:
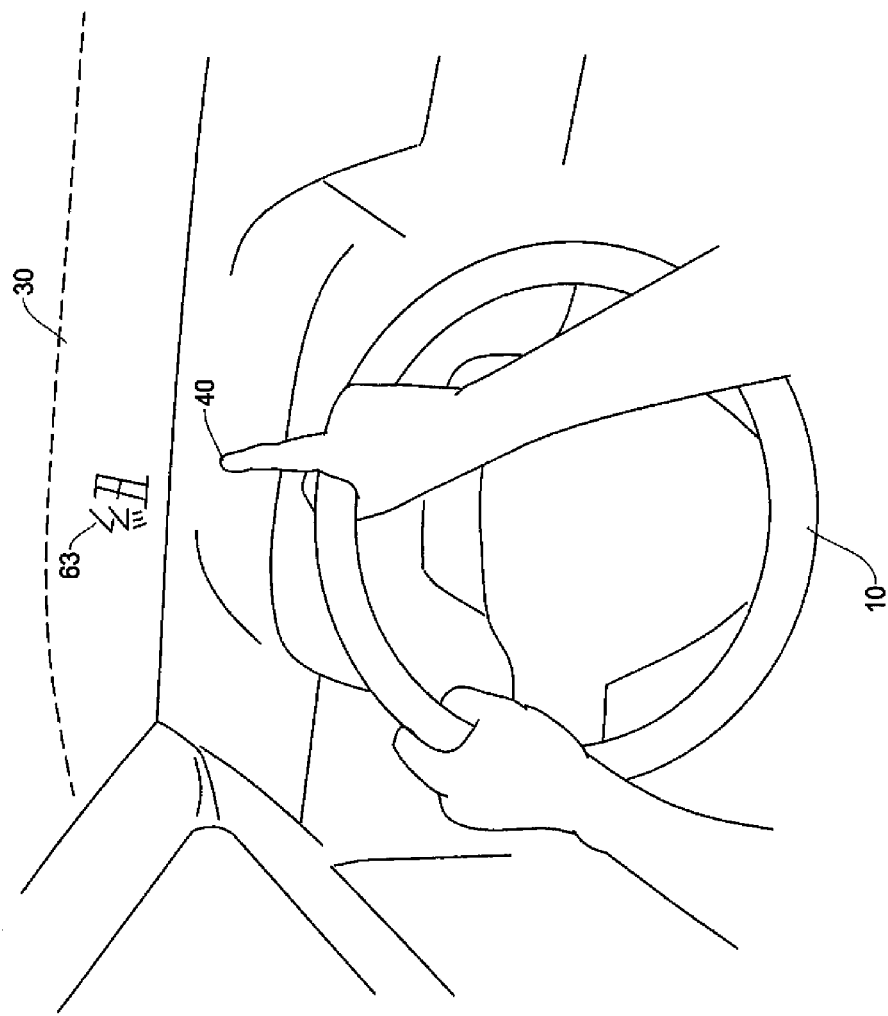

FIG. 3D shows a case where the user draws a Chinese character 63 by moving his/her finger in the air. In many cases, since the Chinese characters tend to be more complicated than most of the Roman characters, the finger gesture for such Chinese characters may be predefined signs or a user-defined signs for simplifying the finger gesture. Thus, the interface method and apparatus disclosed here can be used by users of languages written with a no-Roman character set.

As well known in the art, the information on the POI icons can be stored in a data storage device such as a ROM, RAM, hard disk, solid state drive, optical disk, etc., of the navigation system. Alternatively, the POI icons can be transmitted to the navigation system from a remote server which is communicably connected with the navigation system. In the case of automobile entertainment system, the information such as artist names, song titles, etc. can be stored in a portable player that is connected to the automobile entertainment system.

Figure 4:
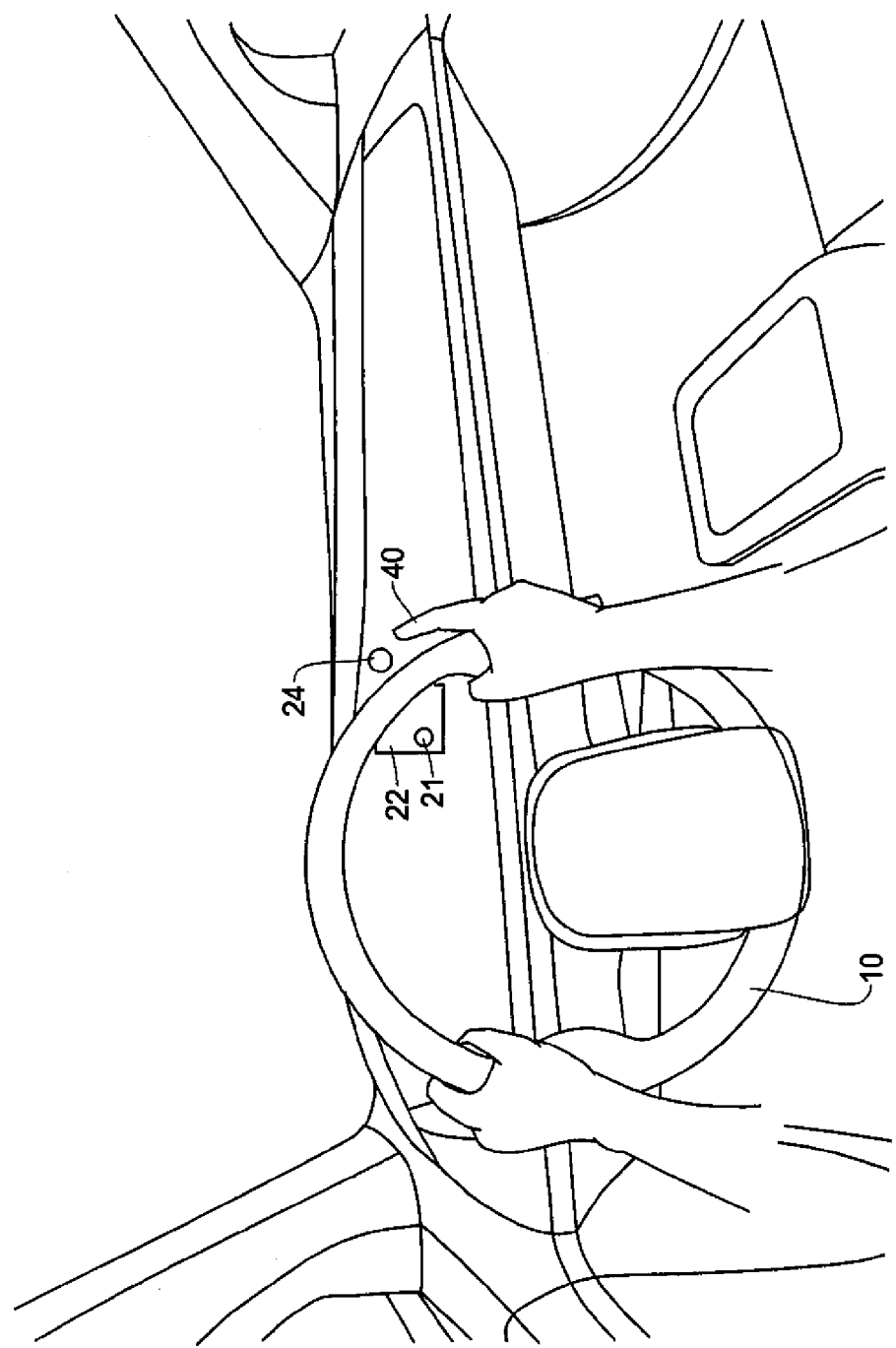
FIG. 4 illustrates an example of a vehicle interior implementing an embodiment of the interface method and apparatus for inputting information in a navigation system with the driver's finger gesture while the driver's two hands are on the steering wheel, which includes a finger position different from that of the previous examples.

FIG. 4 illustrates another embodiment with a vehicle interior, similar to that of FIGS. 3A-3D except that the user's right hand for producing the finger gesture is located more toward the right side of the steering wheel 10. Also, the gesture sensor 22 typically including the video camera 21 is shown in FIG. 4. Further, a light adjustment unit 24 is provided to establish an optimum lighting level around the area of the user's finger gesture.

Although not shown in FIG. 4, preferably, an area for detecting a finger gesture may be defined by the gesture processor based on the sensor size, sensor property, location of steering wheel, user's preference, etc. for an optimum performance of the gesture sensor. Within the context of this disclosure, such an area is referred to as a "finger gesture area" (see FIGS. 5 and 6A-6B) in which the user's finger gesture is captured and detected at a predefined area around the steering wheel 10. The finger gesture area prevents accidental and unintended input by the user by limiting the capturing of the finger gesture to the particular area defined by the finger gesture area.

As noted above, the light adjustment unit 24 may be preferably provided to establish an optimum lighting level around the finger gesture area to maintain stable performances for detecting the finger gesture. This is because the operation of sensing the finger gesture may be affected by the brightness or darkness in the interior of the vehicle. Thus, the light adjustment unit 24 is provided to maintain the constant lighting level at the finger gesture area in the vehicle.

The light adjustment unit 24 may be configured by a light sensor such as a photodiode and a light source such as an LED (light emitting diode). The light sensor detects the lighting condition around the finger gesture area and produces a detection signal. In response to the detection signal, the light source produces the illumination to maintain the optimum lighting condition to the finger gesture area. Consequently, the light adjustment unit 24 contributes to improve the detection accuracy and stability of the user's finger gesture.

Figure 5:
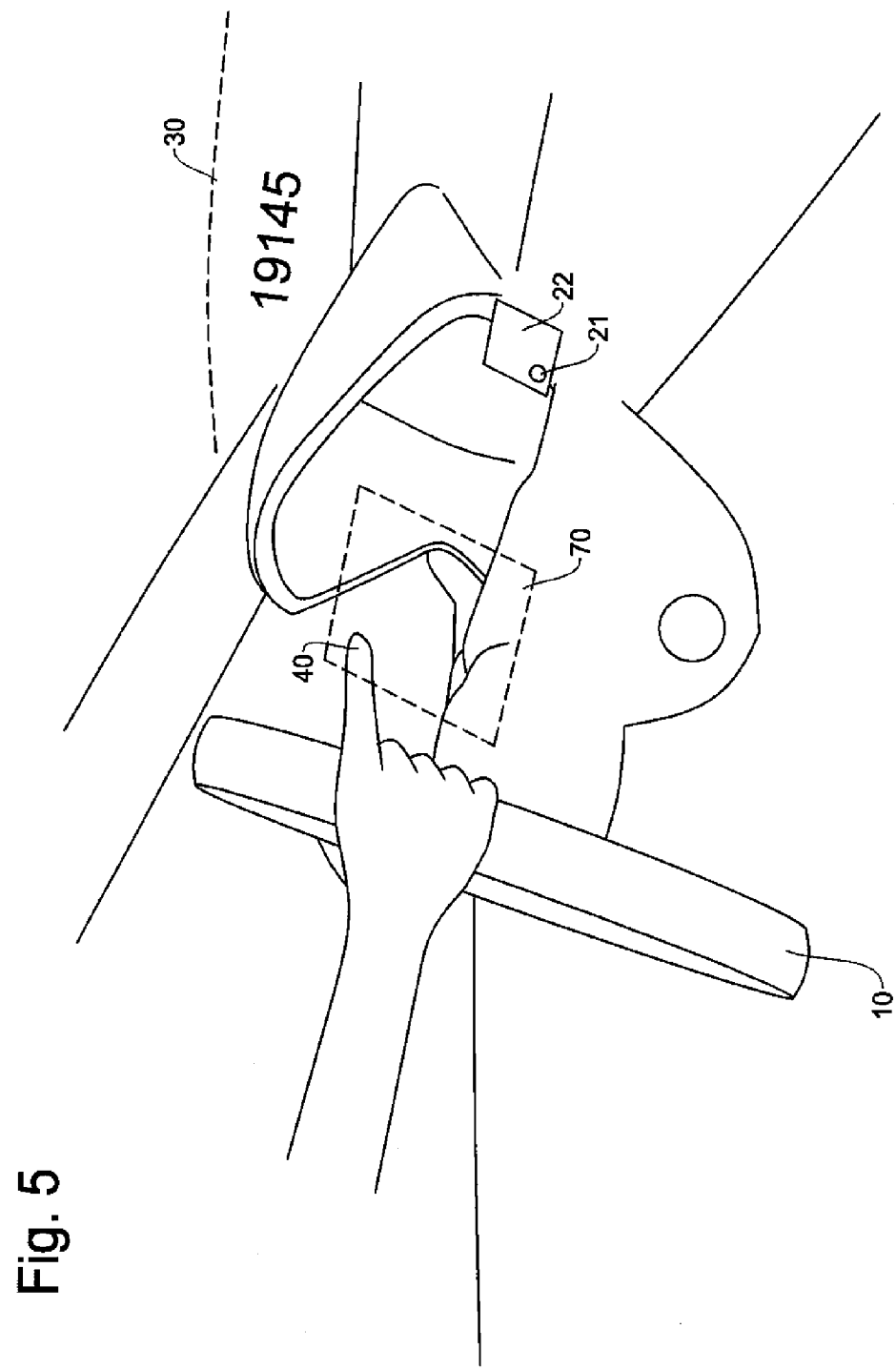
FIG. 5 illustrates an example of a vehicle interior implementing an embodiment of the interface method and apparatus for inputting information in a navigation system as viewed from a right side of the user to show the relationship among the user's finger, steering wheel, finger gesture sensor, finger gesture area, and windshield.

FIG. 5 shows the embodiment of the interface method and apparatus described above viewed from a different angle, i.e., viewed from the right side of the user. This drawing shows the relationship among the user's finger, steering wheel, finger gesture sensor, finger gesture area, and HUD (head-up display) on the windshield. The gesture sensor 22 with the video camera 21 is mounted on the dashboard of the vehicle and the finger gesture area 70 noted above is established in the air close to the steering wheel 10 and the user's right hand. The head-up display (HUD) 30 is established on the windshield of the vehicle to display the information specified by the finger movements of the user.

As can be seen, the user may place both hands on the steering wheel 10 while moving his/her index finger 40 within the finger gesture area 70. As noted above, the finger gesture area 70 is an area defined in a midair to distinguish the valid finger movements made inside of the finger gesture area from the invalid finger movements made outside of the finger gesture area. The fingertip itself makes a finger gesture in the midair and does not contact with any other physical device. Thus, the user can make the finger gesture movement without losing contact with the steering wheel 10, thereby improving the operability of the interface apparatus while maintaining the driving safety.

The steering wheel 10 may preferably be connected to a steering wheel turn sensor 128 (see FIG. 8) that detects steering wheel movements. Since the steering wheel turning operation can adversely affect the capturing process of the finger gesture by the gesture sensor 22, it is preferable to compensate the turning operation in the detection of the finger gesture. Therefore, based on the movement of the steering wheel as determined by the steering wheel turn sensor 128, the gesture processor 127 (see FIG. 8) is able to correct the driver's finger gesture.

For instance, when the user turns the steering wheel to the left, the user's hand that is making a finger gesture is expected to move to the left as well. The steering wheel turn sensor 128 detects the steering wheel turn movement and the gesture processor 127 determines a possible displacement of the hand making the finger gesture. When the steering wheel turn operation is performed in the middle of finger gesture, the analysis of the finger gesture may be supplemented by the correction mechanism that takes into account the displacement of the finger caused by the steering wheel movement. In the case where the degree of movement of the steering wheel during the user's finger gesture is larger than a predetermined degree, the gesture processor may reset the analysis of the finger gesture.

Figure 6A:
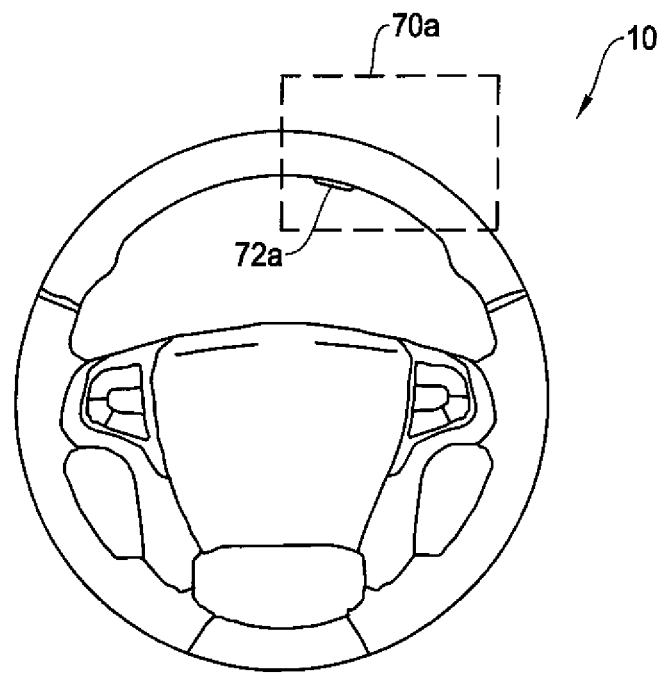
FIGS. 6A and 6B show examples of effective finger gesture area that can be utilized in the present embodiment and a button located on a steering wheel to assist the finger gesture input operation.
Figure 6B:
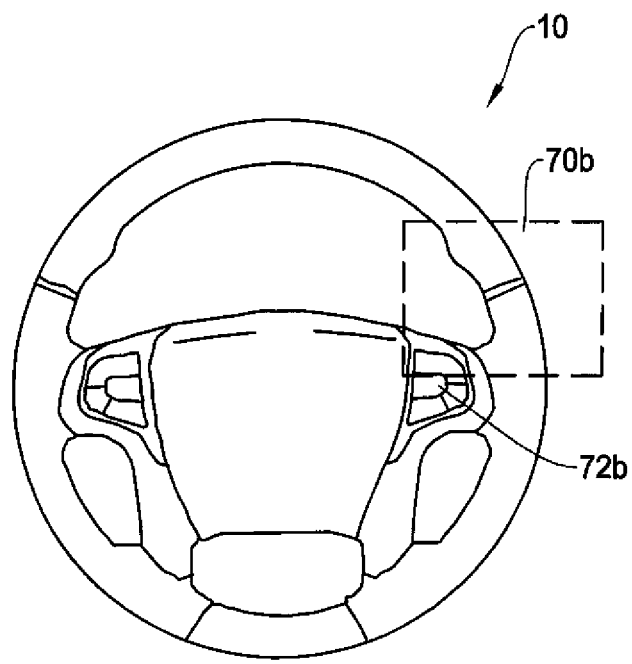

FIGS. 6A and 6B show examples of effective finger gesture area that can be utilized in the present embodiment and a button/switch located on or close to a steering wheel to assist the finger gesture input operation. As noted above, the finger gesture area is an area defined in a midair to distinguish the valid finger movements made inside of the finger gesture area from the invalid finger movements made outside of the finger gesture area. The finger gesture area prevents accidental and unintended input by the user by limiting the capturing of the finger gesture to the particular area defined by the finger gesture area. The finger gesture area may be preset by a manufacturer of an electronics system such as a navigation system or set by a user according to his/her preference.

FIG. 6A shows a finger gesture area 70a represented by dotted lines at an upper right portion of the steering wheel 10 to define the area to perform the finger gesture. A button (switch) 72a is provided at a location that is close to the finger gesture area 70a which may be preferably used to start, stop, execute, etc., of each operation for inputting the finger gesture. The button 72a may not be essential to the embodiment of the interface method and apparatus but will be convenient in separating the finger gesture from the finger movements of the user unrelated to the interfacing operation.

FIG. 6B is similar to FIG. 6A except that a finger gesture area 70b is located closer to the top of the vehicle steering wheel 10. A button (switch) 72b for the same purpose of the button 72a noted above is located at a location that is close to the finger gesture area 70b. The button and finger gesture area are not limited to the positions shown and described in the foregoing and may be positioned at any other suitable positions. The effective finger gesture area may be changed by a user through, for example, a set-up menu (not shown) of the navigation system.

Figure 7:
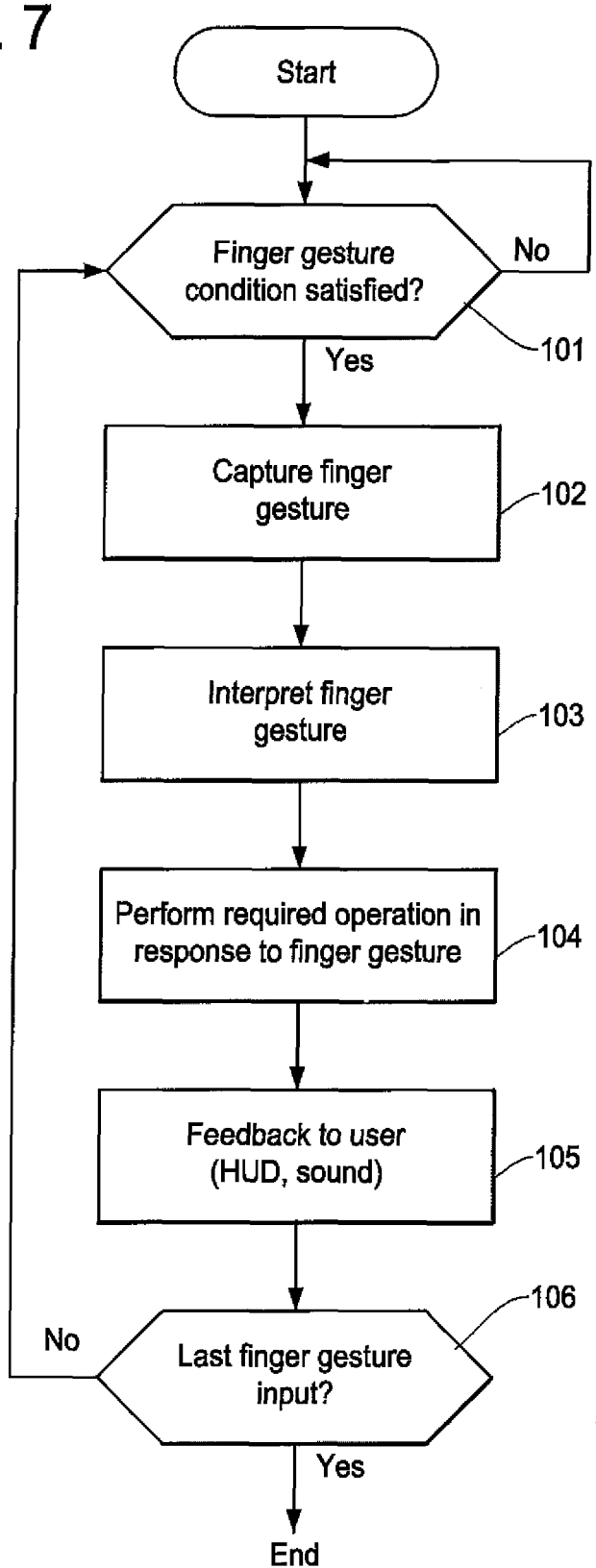
FIG. 7 is a flowchart showing an example of basic operational steps for inputting information in the navigation system through the finger gesture according to the interface method.

Referring to the flowchart in FIG. 7, the basic operational steps in the interface method through a finger gesture operation is described. The finger gesture is detected by the gesture sensor and the resultant information specified by the finger gesture is shown on a head-up display (HUD). As noted above, a structural and software example for detecting the gesture that can be implemented in the embodiment of the present application is disclosed in U.S. Patent Application Publication No. 2005/0248529. Further, an example of structure of the head-up display (HUD) system that can be implemented in the embodiment of the present application is disclosed in U.S. Pat. No. 4,973,139.

In FIG. 7, after the start, the process monitors the condition of the interface apparatus at step 101 to determine whether a finger gesture input condition is satisfied. Here, the finger gesture input condition is a condition for the interface method and apparatus to start accepting the finger gesture and executing the input operations in accordance with the interpreted finger gesture. Examples of the finger gesture input condition include whether a user's hand is on a steering wheel, whether a user's hand is located in a predetermined area for which a finger gesture is to be performed, whether the vehicle is within a predetermined speed, and whether the user has made a command by voice or button to start the finger gesture operation, etc.

Figure 8:
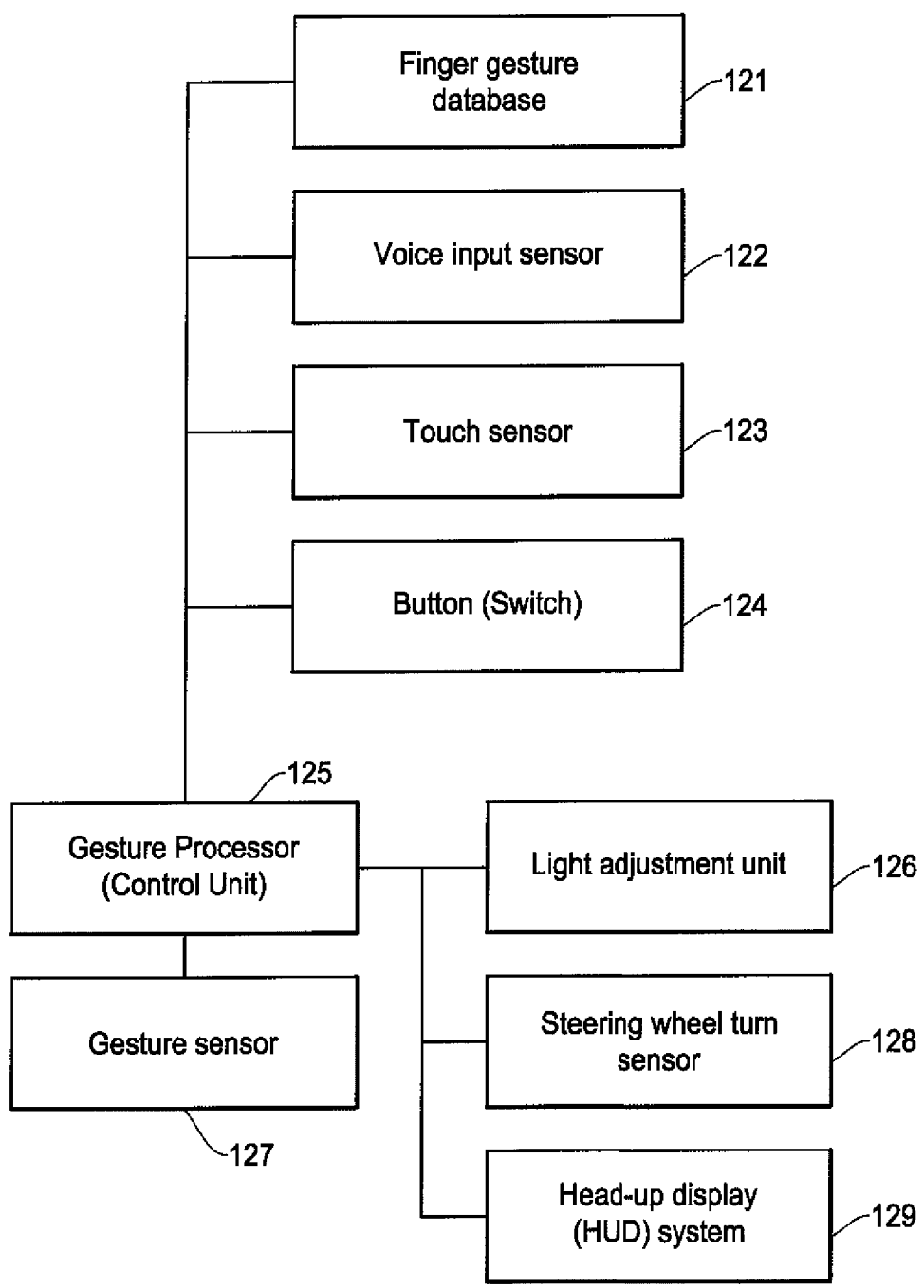
FIG. 8 is a block diagram showing an example of structure in the interface apparatus for inputting information or instruction in the navigation system, etc., through the finger gesture.

The determination of whether the user's hand is on the steering wheel may be made by a touch sensor 123 in FIG. 8. The determination of whether a user's hand is located in a predetermined area for which a finger gesture is to be performed (finger gesture area) may be made based on an image captured by the gesture sensor 22 in FIGS. 2A-2B and 4. One or more finger gesture input conditions described above may be used singly or in combination.

If the finger gesture input condition is satisfied, in step 102, the interface apparatus captures the user's gesture by the gesture sensor. As noted above, the gesture sensor is typically a video camera that functions as an image sensor or a motion sensor. The user can provide the information to the interface apparatus by performing one or more finger gestures, such as drawing an alphanumeric character. The gesture sensor captures a depth image of a particular area (finger gesture area) in a three dimensional space where coordinates and movements of the user's hand and/or finger are detected.

Figure 10:
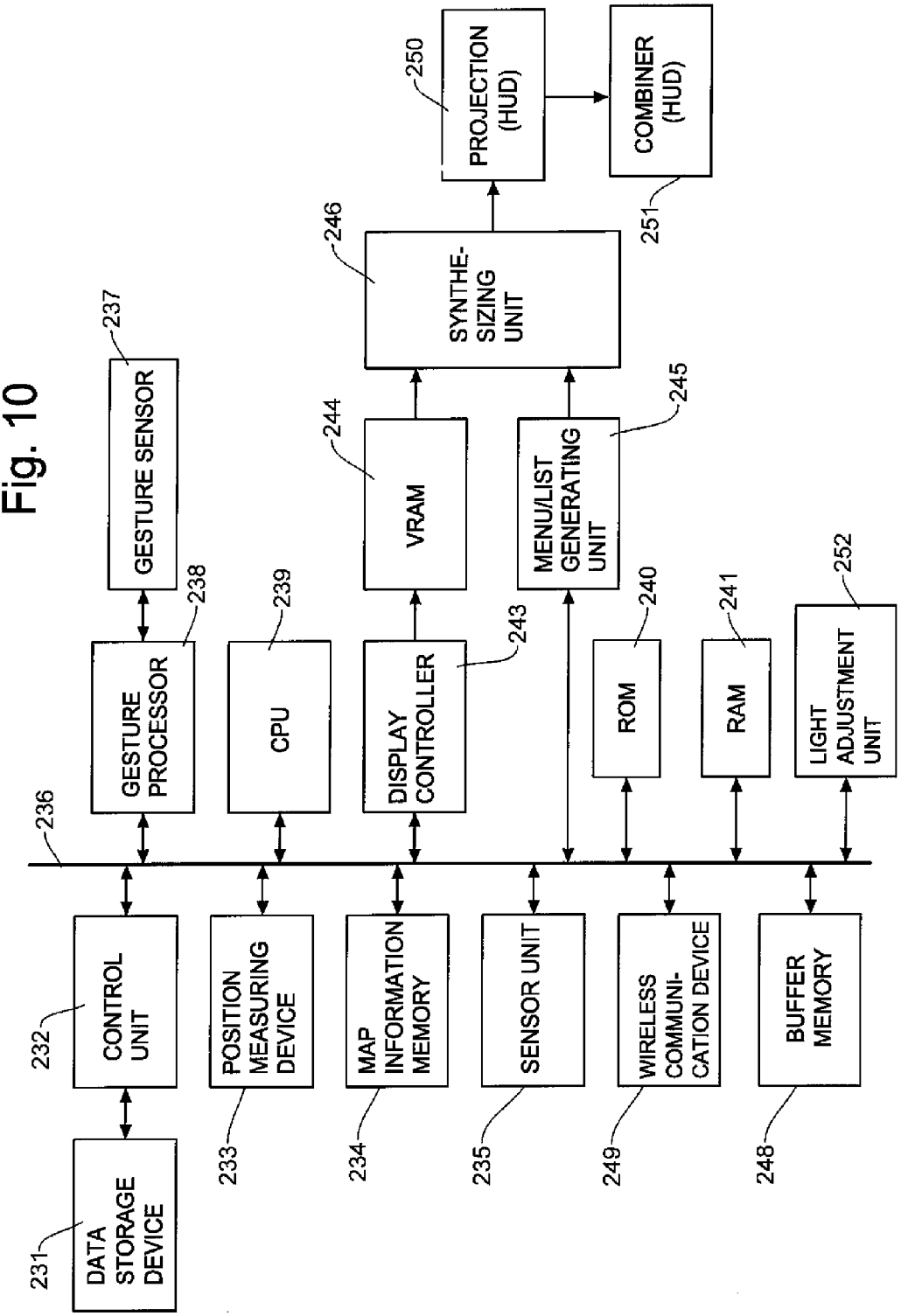
FIG. 10 is a block diagram showing an example of a structure in a vehicle navigation system that implements the interface method and apparatus for inputting information through the finger gesture.

In the next step 103, the interface apparatus interprets the user's finger gesture which is mainly done by the gesture processor (see FIGS. 8 and 10). The user's finger gesture may express any character or letter associated with a command or keyword depending on the functions of the electronics system such as a navigation system. For example, the user may move the finger to write an alphabet letter "M" to find one or more POIs that start with the letter "M" as described above with reference to FIGS. 3A-3C. In another example, the user may enter by the finger movements non-alphabet characters such as a Chinese character as shown in FIG. 3D.

The interface apparatus has a database 121 (FIG. 8) storing the finger gesture data, which is referenced to determine which letter or command the user has specified by the finger gesture operation. In this procedure, the step of correcting the finger gesture interpretation described above can be performed to compensate for displacement of a hand or a finger during the steering wheel turn operation. For example, during the time when acquiring the finger gesture, if the user's hand on the steering wheel is moved along with the steering wheel movement, such a movement can be compensated based on the signal detected by the steering wheel turn sensor 128 (FIG. 8).

In step 104, the navigation system performs a required operation in response to the finger gesture that is interpreted and determined in the step 103. In the above example shown in FIGS. 3A-3C, the navigation system retrieves the POIs that start with the letter "M" from the map database (data storage device 231 in FIG. 10). In step 105, the interface apparatus feedbacks the results of the search to the user via the head-up display (HUD) 30 which is typically established on the vehicle windshield. For instance, if the user has instructed to find POIs starting with letter "M" in the step 101, the HUD 30 will show the matching POI entries in the manner shown in FIGS. 3A-3C. The manner of feedback is not limited to displaying on the HUD 30, but may also include sound reproduction, or displaying on an LCD screen of the navigation system or automobile entertainment system.

At step 106, the process determines whether the current input operation of the finger gesture is the last input. If it is the last input, the process ends, and if it is not, the process goes back to the step 101 to repeat the foregoing operation steps until the last one is determined. The process typically determines that it is the last input when the user presses the end button such as the button 72a or 72b in FIGS. 6A-6B.

FIG. 8 is a schematic block diagram showing the basic components of the interface apparatus for executing the finger gesture input procedure described above. A gesture sensor 127 captures and detects a user's finger gesture. The gesture sensor 127 may be a video camera or a motion sensor. A plurality of gesture sensors 127 may be provided depending on actual needs such as an enlarged size of the finger gesture area (see FIGS. 5 and 6A-6B). The gesture sensor 127 can be a three-dimensional sensor to detect a three dimensional coordinate position and a movement of the user's hand or finger.

The gesture sensor 127 is electrically and communicably coupled to a gesture processor (control unit) 125 which controls an overall operation of the finger gesture input procedure based on a program stored therein. The gesture processor 125 interprets the user's finger gesture captured by the gesture sensor 127 based on the finger gesture data stored in a finger gesture database 121. A light adjustment unit 126, which is equivalent to the light adjustment unit 24 shown in FIG. 4, detects the lighting intensity around the finger gesture area and adjusts the lighting intensity for optimum capturing of the user's finger gesture.

A steering wheel turn sensor 128 detects the movements of the steering wheel of the vehicle and sends a signal indicating the movement of the steering wheel to the gesture processor 125. Based on the signal from the steering wheel turn sensor 128, the gesture processor 125 compensates the movement of the user's hand in the finger gesture interpretation process. A head-up display (HUD) system 129 (equivalent to HUD 30 in FIGS. 2A-2B and 3A-3C) displays relevant information such as a letter drawn by the user's finger gesture on the windshield of the vehicle.

Supplementary sensors or inputs may be additionally provided to assist the finger gesture operation. A touch sensor 123 is provided to detect whether the user's hand is placed on the steering wheel and if so, the position of the hand to determine if the user's hand is located within a finger gesture area to perform the finger gesture operation. A voice input sensor 122 is provided to accept user's voice command and may be used in conjunction with the finger gesture input.

Preferably, the touch sensor 123 also detects whether both hands of the driver are placed on the steering wheel. In one embodiment, the air finger gesture operation is performed only when the touch sensor 123 has detected that both hands of the driver are placed on the steering wheel. By limiting the finger gesture input operation in this manner, it is expected that the safe driving be maintained during the input operation.

A button (switch) 124 is preferably placed on the steering wheel and is used in conjunction with the finger gesture input. The button 124 is equivalent to the buttons 72a and 72b in FIGS. 6A and 6B and is communicably coupled to the gesture processor to work in conjunction with the finger gesture sensor. For example, pressing the button 124 on the steering wheel may be used to signal the start and end of the finger gesture. In another embodiment, the button 124 may signal confirmation of the selection. In another embodiment, at an end of each stroke during the finger gesture to input a letter, the user may press the button to indicate the end of such a stroke.

Figure 9:
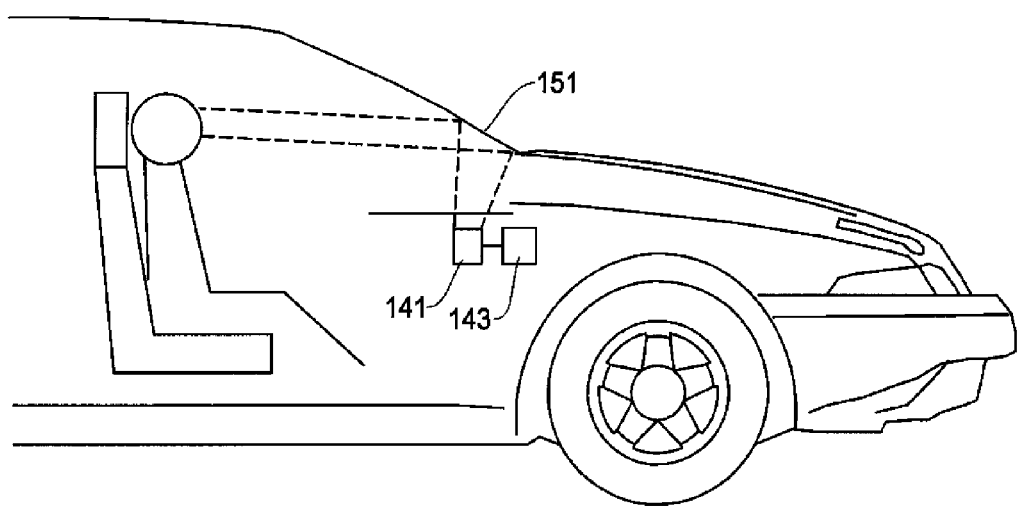
FIG. 9 is a schematic diagram illustrating an example of basic configuration of a head-up display ("HUD") associated with a windshield of a vehicle that can be implemented in the embodiment of the interface apparatus.

FIG. 9 is a schematic diagram showing an example of basic structure of a head-up display (HUD) system and a driver's line of sight that can be incorporated in the embodiments. The head-up display may be configured to display information on a vehicle windshield and provides feedback in response to the user's finger gesture that is captured by the gesture sensor 127. The head-up display is a transparent display that presents text and/or video information without requiring a driver to look away from the usual viewpoint in the driving. In addition to the characters, icons, etc., shown in FIGS. 2A-2B and 3A-3D, the head-up display may also display, among others, speedometer and tachometer of the vehicle, a map image, turn-by-turn indication, etc.

As shown in FIG. 9, the head-up display system has a combiner 151, a projector device 141, and a video generation unit 143. In response to the video signal from the video generation unit 143, the projection device 141 projects an image such as text or video onto the combiner 151 mounted on the windshield. The area or shape of the combiner 151 on which the image is displayed may be varied according to desired implementation.

FIG. 10 shows an example of structure in a vehicle navigation system for implementing the interface method of finger gesture input. In the block diagram, the navigation system includes a data storage device 231 such as a hard disc, solid stated drive, CD-ROM, DVD or other storage means (hereafter "data disc") for storing the map data. The data storage device 231 stores the map data and points of interest (POI) data for navigation operation. The data storage device 231 may also include the finger gesture data for interpretation of the finger gesture in implementing the interface method disclosed by the present application. The navigation system includes a control unit 232 for controlling an operation for reading the information from the data storage medium 231.

A position measuring device 233 is provided for measuring the present vehicle position. For example, the position measuring device 233 has a vehicle speed sensor for detecting a moving distance, a gyroscope for detecting a moving direction, a microprocessor for calculating a position, a GPS (global positioning system) receiver for receiving GPS signals from satellites for determining the position, and etc. A map information memory 234 temporarily stores required amount of map information which is read from the data storage device 231.

A gesture sensor 237 (equivalent to the gesture sensor 22 in FIGS. 2A-2B and 4-5 and the gesture sensor 127 in FIG. 8) such as a motion sensor, video camera or a three-dimensional image sensor captures the user's air finger gesture. A gesture processor 238 (equivalent to the gesture processor 125 in FIG. 8) is a control unit to interpret the user's air finger gesture captured by the gesture sensor 237. A light adjustment unit 252 (equivalent to the light adjustment unit 24 in FIG. 4 and the light adjustment unit 126 in FIG. 9) detects lighting intensity of the finger gesture area and adjusts the lightning condition for optimal capturing of the finger gesture. A sensor unit 235 is used for sensing various parameters for the interfacing operation by the finger gesture by various sensors such as a touch sensor, steering wheel turn sensor, etc. as described with reference to FIG. 8.

In FIG. 10, the navigation system may further include a bus 236 for interfacing the above units in the system, a processor (CPU) 239 for controlling an overall operation of the navigation system, a ROM 240 for storing various control programs such as a route search program and a map matching program necessary for navigation control, a RAM 241 for storing a processing result such as a guide route, a display controller 243 for generating map image (a map guide image and an arrow guide image) on the basis of the map information, a VRAM 244 for storing images generated by the display controller 243, a menu/list generating unit 245 for generating menu image/various list images, and a synthesizing unit 246 to synthesize the images.

A projection 250 (equivalent to the projector device 141 in FIG. 9) projects an image to a combiner 251 (equivalent to the combiner 151 in FIG. 9). The projection 250 and the combiner 151 establish the head-up display (HUD) in the embodiment of the interface method and apparatus of the present application. FIG. 10 further includes a wireless communication device 249 for wireless communication to retrieve data from a remote server, and a buffer memory 248 for temporally storing data for ease of data processing. A program that performs the operation as described with reference to the flowchart of FIG. 7 is stored in the ROM 40 or the data storage medium 231 and is executed by the gesture processor 238 or CPU 239.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. An interface apparatus for an electronics system, comprising:
 a gesture sensor provided near a steering wheel of a vehicle to capture a user's finger gesture;
 a head-up display configured to display information on a vehicle windshield and to provide feedback in response to the user's finger gesture captured by the gesture sensor,
 a gesture processor communicably coupled to the gesture sensor and configured to recognize the user's finger gesture that is received from the gesture sensor, to convert at least a portion of the recognized user's finger gesture into at least one letter, and to interpret the converted one letter to produce a list of entries or options, the entries or options comprising the one letter as a first letter, in order to cause the head-up display to display the information for selection based on the interpreted gesture;
 a light adjustment unit for maintaining a constant lighting level in an area defined as a finger gesture area, where the finger gesture area is a limited space close to the steering wheel within which finger gestures can be made without releasing a user's hand performing the finger gesture from the steering wheel; and
 at least one touch sensor on a steering wheel configured to detect whether a user's hand is placed on the steering wheel and if so, the position of the hand on the steering wheel;
 wherein the list of entries is a plurality of candidate points of interest based on a current vehicle position for optimum routing information, and wherein the gesture sensor and the light adjustment unit are mounted on a dashboard of the vehicle close to the steering wheel, and further wherein the recognition of the user's finger gesture is conditioned upon the detection of the user's hand is placed on the steering wheel detected by the touch sensor.

2. The interface apparatus as defined in claim 1, wherein the gesture sensor is a video camera or a motion sensor.

3. The interface apparatus as defined in claim 1, wherein the head-up display shows a list of entries or options in response to a character drawn by the finger gesture of the user.

4. The interface apparatus as defined in claim 3, wherein the head-up display is configured to show available options in response to the information input by the user's finger gesture, the gesture sensor is configured to detect a direction of the user's finger, and the finger gesture processor is configured to interpret which of the available options on the head-up display has been pointed by the direction of the user's finger.

5. The interface apparatus as defined in claim 1, further comprising:
 a steering wheel turn sensor that detects a movement of the steering wheel and sending a detection signal to the gesture processor;
 wherein the gesture processor corrects the user's finger gesture in response to the detection signal indicating the movement of the steering wheel.

6. The interface apparatus as defined in claim 1, further comprising:
 a button located on or close to the steering wheel, which works in conjunction with the gesture sensor to indicate start and stop of sending the detected finger gesture to the finger gesture processor.

7. The interface apparatus as defined in claim 1, wherein the gesture processor receives a detection signal from the touch sensor and allows an input operation by the finger gesture when the user's both hands are placed on the steering wheel.

8. The interface apparatus as defined in claim 1, wherein only the finger gestures made within the finger gesture area are validated.

9. The interface apparatus as defined in claim 1, wherein the light adjustment unit is comprised of:
 a light sensor for detecting lighting intensity at the finger gesture area in which the user performs the finger gesture; and
 a light source that receives a signal from the light sensor and generates light for adjusting the lighting level at the finger gesture area to be constant thereby improving detection accuracy and stability of the finger gesture.

10. The interface apparatus as defined in claim 1, further comprising:
 a finger gesture database for storing data related to the finger gesture;
 wherein the gesture processor interprets the finger gesture detected by the gesture sensor based on the data retrieved from the finger gesture database.

11. The interface apparatus as defined in claim 1, wherein the electronics system is a vehicle navigation system, and wherein the finger gesture by the user specifies entries related to functions of the navigation system including a selection of a destination.

12. An interface method of inputting information for an electronics system, comprising the following steps of:
- capturing a user's finger gesture by a gesture sensor provided near a steering wheel of a vehicle;
- recognizing the user's finger gesture captured by the gesture sensor by a finger gesture processor, to convert at least a portion of the recognized user's finger gesture into at least one letter, and to interpret the converted one letter to produce a list of entries or options, the entries or options comprising the one letter as a first letter, in order;
- displaying, on a head-up display, information for selection to provide feedback to the user in response to the user's finger gesture;
- maintaining a constant lighting level in an area defined as a finger gesture area by a light adjustment unit, where the finger gesture area is a limited space close to the steering wheel within which finger gestures can be made without releasing a user's hand performing the finger gesture from the steering wheel; and
- detecting, by a touch sensor, whether a user's hand is placed on the steering wheel of the vehicle and if so, the position of the hand on the steering wheel;
- wherein the list of entries is a plurality of candidate points of interest based on a current vehicle position for optimum routing information, and wherein the gesture sensor and the light adjustment unit are mounted on a dashboard of the vehicle close to the steering wheel, and further wherein the recognition of the user's finger gesture is conditioned upon the detection of the user's hand placed on the steering wheel detected by the touch sensor.

13. The method of inputting information as defined in claim 12, further comprising a step of:
- receiving a signal generated by a button located on or close to the steering wheel;
- wherein the button work in conjunction with the gesture sensor to indicate start and stop of sending the detected finger gesture to the finger gesture processor.

14. The interface method of inputting information as defined in claim 12, further comprising the following steps of:
- displaying a plurality of information entries on the head-up display; and
- interpreting a direction of the user's finger to determine which information entry is selected.

15. The method of inputting information as defined in claim 12, further comprising a step of:
- validating only the finger gestures made within the finger gesture area.

16. The method of inputting information as defined in claim 12, further comprising the following steps of:
- detecting a movement of the steering wheel by a steering wheel turn sensor and sending a detection signal to the gesture processor; and
- correcting, by the gesture processor, the user's finger gesture in response to the detection signal indicating the movement of the steering wheel.

17. The method of inputting information as defined in claim 12, further comprising a step of:
- allowing an input operation by the finger gesture when the user's both hands are placed on the steering wheel.

18. The method of inputting information as defined in claim 12, wherein the electronics system is a vehicle navigation system, and wherein the finger gesture by the user specifies entries related to functions of the navigation system including a selection of a destination.

* * * * *